(12) United States Patent
Itogawa

(10) Patent No.: US 8,982,401 B2
(45) Date of Patent: Mar. 17, 2015

(54) IMAGE RECORDING SYSTEM, IMAGE RECORDING METHOD, MOBILE TERMINAL, NON-TRANSITORY STORAGE MEDIUM STORING INSTRUCTIONS EXECUTABLE BY MOBILE TERMINAL, AND IMAGE RECORDING APPARATUS

(71) Applicant: Yoshihiro Itogawa, Mizuho (JP)

(72) Inventor: Yoshihiro Itogawa, Mizuho (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/193,263

(22) Filed: Feb. 28, 2014

(65) Prior Publication Data
US 2014/0240778 A1 Aug. 28, 2014

(30) Foreign Application Priority Data
Feb. 28, 2013 (JP) .................................. 2013-039604

(51) Int. Cl.
*G06F 3/12* (2006.01)
(52) U.S. Cl.
CPC ............ *G06F 3/1292* (2013.01); *G06F 3/1236* (2013.01)
USPC ....... 358/1.15; 358/1.14; 358/1.16; 455/41.1; 455/41.2
(58) Field of Classification Search
USPC ................................ 358/1.15, 1.16, 1.13, 1.1
See application file for complete search history.

(56) References Cited

U.S. PATENT DOCUMENTS

| 2009/0036056 | A1* | 2/2009 | Oshima et al. | ............... 455/41.3 |
| 2010/0081383 | A1 | 4/2010 | Takeda | |
| 2010/0245903 | A1* | 9/2010 | Sakakibara | ................... 358/1.15 |
| 2011/0116125 | A1* | 5/2011 | Park | ............................ 358/1.15 |
| 2011/0292445 | A1 | 12/2011 | Kato | |
| 2012/0250059 | A1 | 10/2012 | Itogawa et al. | |

FOREIGN PATENT DOCUMENTS

| JP | 2010-081408 A | 4/2010 |
| JP | 2010-241114 A | 10/2010 |

* cited by examiner

*Primary Examiner* — Martin Mushambo
(74) *Attorney, Agent, or Firm* — Merchant & Gould PC

(57) ABSTRACT

An image recording system includes a mobile terminal and an image recording apparatus. The mobile terminal successively stores signals representative of its position at least from establishment of first wireless communication between the mobile terminal and the image recording apparatus. When information produced based on the signals coincides with at least one of sets of reference information which respectively correspond to image recording conditions, the mobile terminal determines at least one command for commanding at least one image recording condition respectively corresponding to the at least one set of reference information. The mobile terminal transmits the at least one command to the image recording apparatus over the first wireless communication or second wireless communication and transmits image data to the image recording apparatus over the second wireless communication. The image recording apparatus uses at least one image recording condition to record an image based on the image data.

15 Claims, 12 Drawing Sheets

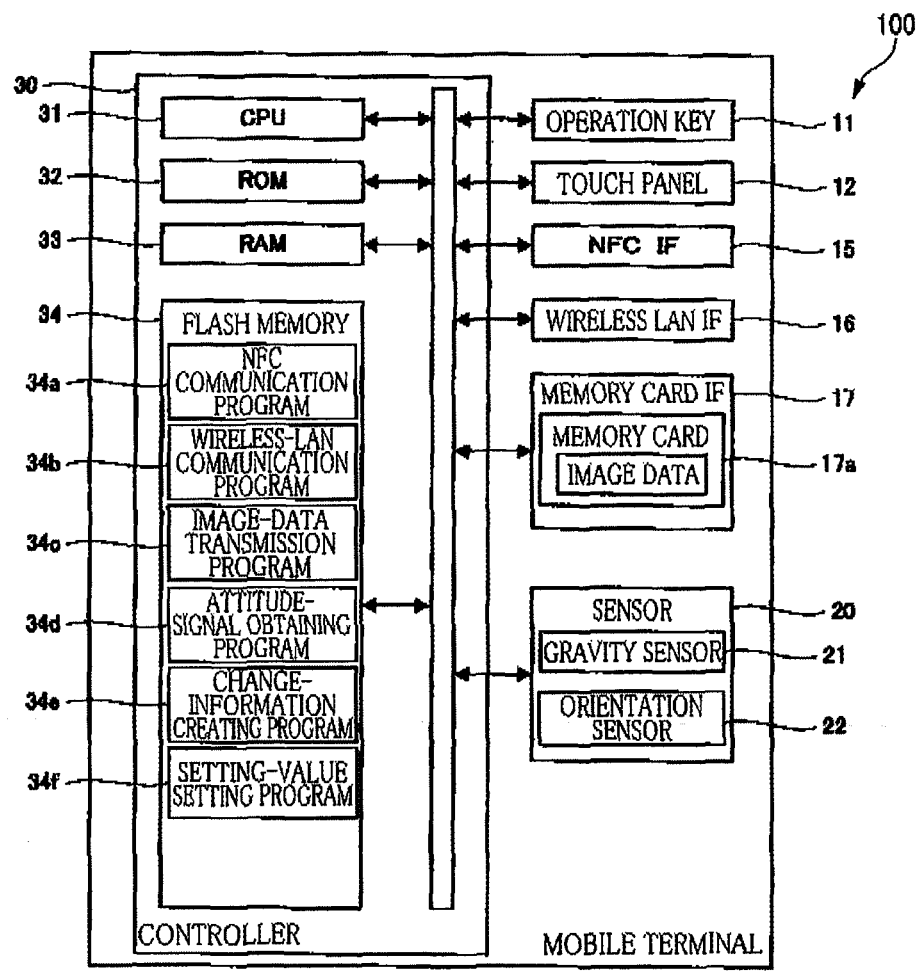

IMAGE RECORDING SYSTEM, IMAGE RECORDING METHOD, MOBILE TERMINAL, NON-TRANSITORY STORAGE MEDIUM STORING INSTRUCTIONS EXECUTABLE BY MOBILE TERMINAL, AND IMAGE RECORDING APPARATUS

CROSS REFERENCE TO RELATED APPLICATION

The present application claims priority from Japanese Patent Application No. 2013-039604, which was filed on Feb. 28, 2013, the disclosure of which is herein incorporated by reference in its entirety.

BACKGROUND OF THE INVENTION

1. Field of the Invention

The present invention relates to an image recording system, an image recording method, a mobile terminal, a non-transitory storage medium storing a plurality of instructions executable by a computer of the mobile terminal, and an image recording apparatus.

2. Description of the Related Art

There is known a printing system in which image data stored in a mobile terminal is transmitted to an image recording apparatus, and the image recording apparatus prints an image based on the received image data. For example, there is known a printing system including a mobile terminal and an image recording apparatus which can perform data communication therebetween according to two wireless communication standards. In this printing system, when communication according to a first wireless communication standard is established, communication setting information and print setting information are transmitted from the mobile terminal to the image recording apparatus. The image recording apparatus then uses the received communication setting information to establish communication according to a second wireless communication standard is faster, and after receiving image data from the mobile terminal over the communication according to the second wireless communication standard, the image recording apparatus prints an image based on the print setting information received over the communication according to the first wireless communication standard.

SUMMARY OF THE INVENTION

Incidentally, the above-described printing system requires a user to use a mobile terminal to set print setting information. However, the mobile terminal, especially, a small-sized mobile terminal does not offer good operability, resulting in lower operability of the printing system.

This invention has been developed to provide an image recording system, an image recording method, a mobile terminal, a non-transitory storage medium storing a plurality of instructions executable by a computer of the mobile terminal, and an image recording apparatus, each capable of improving operability for a user.

The present invention provides an image recording system including: a mobile terminal; and an image recording apparatus configured to record an image on a recording medium. The mobile terminal includes: a storage configured to store image data and a table including a plurality sets of reference information, the plurality sets of reference information each being in association with a corresponding one of a plurality of image recording conditions; a mobile-terminal first communication device configured to perform data communication with the image recording apparatus over first wireless communication which is established when a distance between the mobile terminal and the image recording apparatus is less than a communicable distance; a mobile-terminal second communication device configured to perform data communication with the image recording apparatus over second wireless communication which is established based on communication setting information about the mobile terminal and the image recording apparatus; a position detector configured to output a signal representative of a position of the mobile terminal; and a mobile-terminal controller configured to control the mobile-terminal first communication device, the mobile-terminal second communication device, and the position detector. The mobile-terminal controller is configured to perform: establishing the first wireless communication between the mobile terminal and the image recording apparatus; at least one of (i) transmitting the communication setting information about the mobile terminal over the first wireless communication and (ii) receiving the communication setting information about the image recording apparatus over the first wireless communication; successively storing signals output by the position detector, while the first wireless communication between the mobile terminal and the image recording apparatus is established; determining a particular set of reference information in accordance with at least one of the signals stored; determining a particular image recording condition in association with the particular set of reference information; transmitting, to the image recording apparatus over one of the first wireless communication and the second wireless communication, a command for causing the image recording apparatus in accordance with the particular image recording condition; transmitting, to the image recording apparatus over the second wireless communication, image data based on which the image recording apparatus is to record an image among the image data stored in the storage. The image recording apparatus includes: an image-recording-apparatus first communication device configured to perform data communication with the mobile terminal over the first wireless communication; an image-recording-apparatus second communication device configured to perform data communication with the mobile terminal over the second wireless communication; an image recording mechanism configured to record an image on a recording medium based on the image data; and an image-recording-apparatus controller configured to control the image-recording-apparatus first communication device, the image-recording-apparatus second communication device, and the image recording mechanism. The image-recording-apparatus controller is configured to perform: at least one of (i) receiving the communication setting information about the mobile terminal which is transmitted by the control of the mobile-terminal controller over the first wireless communication and (ii) transmitting the communication setting information about the image recording apparatus which is received by the control of the mobile-terminal controller over the first wireless communication; and controlling the image recording mechanism to use an image recording condition determined based on the command transmitted from the mobile terminal, to record an image based on the image data transmitted from the mobile terminal over the second wireless communication.

The present invention also provides an image recording method in an image recording system including: a mobile terminal; and an image recording apparatus configured to record an image on a recording medium. The mobile terminal includes: a storage configured to store image data and a table including a plurality sets of reference information, the plurality sets of reference information each being in association with a corresponding one of a plurality of image recording conditions; a mobile-terminal first communication device configured to perform data communication with the image recording apparatus over first wireless communication which is established when a distance between the mobile terminal and the image recording apparatus is less than a communicable distance; a mobile-terminal second communication device configured to perform data communication with the image recording apparatus over second wireless communication which is established based on communication setting information about the mobile terminal and the image recording apparatus; and a position detector configured to output a signal representative of a position of the mobile terminal. The image recording apparatus includes: an image-recording-apparatus first communication device configured to perform data communication with the mobile terminal over the first wireless communication; an image-recording-apparatus second communication device configured to perform data communication with the mobile terminal over the second wireless communication; and an image recording mechanism configured to record an image on a recording medium based on the image data. The image recording method includes: establishing the first wireless communication between the mobile terminal and the image recording apparatus; performing at least one of (i) causing the mobile terminal to transmit the communication setting information about the mobile terminal over the first wireless communication and (ii) causing the mobile terminal to receive the communication setting information about the image recording apparatus over the first wireless communication; causing the mobile terminal to successively store signals output by the position detector, while the first wireless communication between the mobile terminal and the image recording apparatus is established; causing the mobile terminal to determine a particular set of reference information in accordance with at least one of the signals stored; causing the mobile terminal to determine a particular image recording condition in association with the particular set of reference information; causing the mobile terminal to transmit, to the image recording apparatus over one of the first wireless communication and the second wireless communication, a command for causing the image recording apparatus in accordance with the particular image recording condition; causing the mobile terminal to transmit, to the image recording apparatus over the second wireless communication, image data based on which the image recording apparatus is to record an image among the image data stored in the storage; performing at least one of (i) causing the image recording apparatus to receive the communication setting information about the mobile terminal which is transmitted over the first wireless communication and (ii) causing the image recording apparatus to transmit the communication setting information about the image recording apparatus which is received over the first wireless communication; and causing the image recording mechanism to use an image recording condition determined based on the command transmitted from the mobile terminal, to record an image based on the image data transmitted from the mobile terminal over the second wireless communication.

The present invention also provides a mobile terminal including: a storage configured to store image data and a table including a plurality sets of reference information, the plurality sets of reference information each being in association with a corresponding one of a plurality of image recording conditions; a mobile-terminal first communication device configured to perform data communication with the image recording apparatus over first wireless communication which is established when a distance between the mobile terminal and the image recording apparatus is less than a communicable distance; a mobile-terminal second communication device configured to perform data communication with the image recording apparatus over second wireless communication which is established based on communication setting information about the mobile terminal and the image recording apparatus; a position detector configured to output a signal representative of a position of the mobile terminal; and a mobile-terminal controller configured to control the mobile-terminal first communication device, the mobile-terminal second communication device, and the position detector. The mobile-terminal controller is configured to perform: establishing the first wireless communication between the mobile terminal and the image recording apparatus; at least one of (i) transmitting the communication setting information about the mobile terminal over the first wireless communication and (ii) receiving the communication setting information about the image recording apparatus over the first wireless communication; successively storing signals output by the position detector, while the first wireless communication between the mobile terminal and the image recording apparatus is established; determining a particular set of reference information in accordance with at least one of the signals stored; determining a particular image recording condition in association with the particular set of reference information; transmitting, to the image recording apparatus over one of the first wireless communication and the second wireless communication, a command for causing the image recording apparatus in accordance with the particular image recording condition; transmitting, to the image recording apparatus over the second wireless communication, image data based on which the image recording apparatus is to record an image among the image data stored in the storage.

The present invention also provides a non-transitory storage medium storing a plurality of instructions executable by a computer of a mobile terminal. The mobile terminal includes: a storage configured to store image data and a table including a plurality sets of reference information, the plurality sets of reference information each being in association with a corresponding one of a plurality of image recording conditions; a mobile-terminal first communication device configured to perform data communication with the image recording apparatus over first wireless communication which is established when a distance between the mobile terminal and the image recording apparatus is less than a communicable distance; a mobile-terminal second communication device configured to perform data communication with the image recording apparatus over second wireless communication which is established based on communication setting information about the mobile terminal and the image recording apparatus; and a position detector configured to output a signal representative of a position of the mobile terminal. The plurality of instructions, when executed by the computer, cause the mobile terminal to perform: at least one of (i) transmitting the communication setting information about the mobile terminal over the first wireless communication and (ii) receiving the communication setting information about the image recording apparatus over the first wireless communication; successively storing signals output by the position detector, while the first wireless communication between the mobile terminal and the image recording apparatus is established; determining a particular set of reference information in accordance with at least one of the signals stored; determining a particular image recording condition in association with the particular set of reference information; transmitting, to the image recording apparatus over one of the first wireless communication and the second wireless communication, a command for causing the image recording apparatus in accordance with the particular image recording condition; transmitting, to the image recording apparatus over the second wireless communication, image data based on which the image recording apparatus is to record an image among the image data stored in the storage.

The present invention also provides an image recording apparatus including: an image-recording-apparatus first communication device configured to perform data communication with a mobile terminal over first wireless communication which is established when a distance between the mobile terminal and the image recording apparatus is less than a communicable distance; an image-recording-apparatus second communication device configured to perform data communication with the mobile terminal over second wireless communication which is established based on communication setting information about the mobile terminal and the image recording apparatus; an image recording mechanism configured to record an image on a recording medium based on image data; and an image-recording-apparatus controller configured to control the image-recording-apparatus first communication device, the image-recording-apparatus second communication device, and the image recording mechanism. The image-recording-apparatus controller is configured to perform: at least one of (i) receiving the communication setting information about the mobile terminal which is transmitted from the mobile terminal over the first wireless communication and (ii) transmitting the communication setting information about the image recording apparatus which is received by the mobile terminal over the first wireless communication; continuing to receive at least one command for an image recording condition from the mobile terminal over the first wireless communication until the first wireless communication is disconnected; and after a predetermined length of time has passed from the disconnection of the first wireless communication, controlling the image recording mechanism to use the image recording condition indicated by the at least one command received from the mobile terminal, to record an image based on the image data transmitted from the mobile terminal over the second wireless communication.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 3A is a block diagram illustrating an electric configuration of a mobile terminal illustrated in FIG. 1, FIG. 3B is a view illustrating a printing-surface change table, and FIG. 3C is a view illustrating a printing-orientation change table;

DETAILED DESCRIPTION OF THE EMBODIMENT

<Overall Configuration of Image Recording System>

Figure 1:
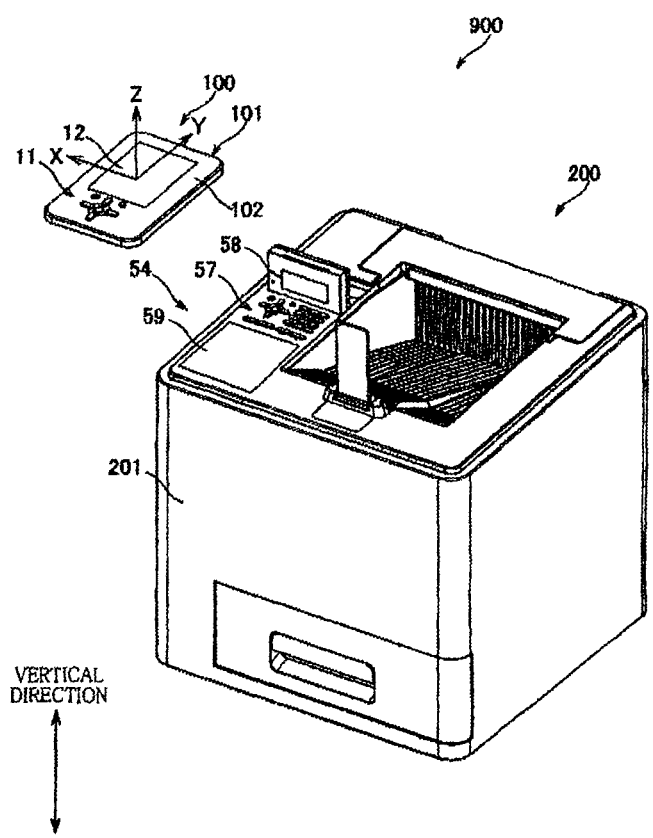
FIG. 1 is an external perspective view illustrating an image recording system according to a first embodiment.

Hereinafter, there will be described an image recording system according to a first embodiment of the present invention by reference to the drawings. As illustrated in FIG. 1, an image recording system 900 according to the present embodiment includes: a multi-function peripheral (MFP) 200 as one example of an image recording apparatus having a printing function and an image reading function (that is, the MFP 200 includes a scanner); and a mobile terminal 100 configured to output image data to be printed by the MFP.

The printing function allows the MFP 200 to perform duplex printing for printing images on both sides (surfaces) of a recording medium in the form of a sheet. The mobile terminal 100 is a mobile device such as a mobile phone and a personal digital assistant (PDA). The mobile terminal 100 can transmit and receive data to and from the MFP 200 over wireless communication according to the NFC (Near Field Communication) as one example of first wireless communication and a wireless communication according to the Wi-Fi (Wireless Fidelity) direct standard as one example of second wireless communication.

The wireless communication according to the NFC standard (hereinafter referred to as "NFC communication") is wireless communication having a very short communicable distance or range of, e.g., about 10 cm. The NFC communication is established by touching the mobile terminal 100 and the MFP 200 together or bringing them into close proximity. A communication speed in the NFC communication is slower than that in the wireless communication according to the Wi-Fi direct standard (hereinafter referred to as "WFD communication"), and accordingly the NFC communication is used for communication of a relatively small amount of data. It is noted that the short communicable distance of the NFC communication facilitates identifying a communication partner or device, and accordingly communication can be established more easily in the NFC communication than in the WFD communication. That is, the user needs to bring the mobile terminal 100 near the MFP 200 as the communication partner, but this operation itself designates the communication partner, eliminating the need for setting communication settings.

The WFD communication is local wireless communication having a communicable distance or range which is generally ranged between several meters and several tens of meters. Here, the WFD communication establishes a network on which data can be transferred. Thus, a WFD network needs to be established for data communication between a transmitter device and a receiver device.

In the image recording system 900 according to the present embodiment, when NFC communication is established between the mobile terminal 100 and the MFP 200, WFD connection information (as one example of communication setting information) for establishing WFD communication is transferred between the mobile terminal 100 and the MFP 200. The WFD communication between the mobile terminal 100 and the MFP 200 is established based on this WFD connection information (that is, what is called a handover is performed).

<Structure of MFP>

Figure 2:
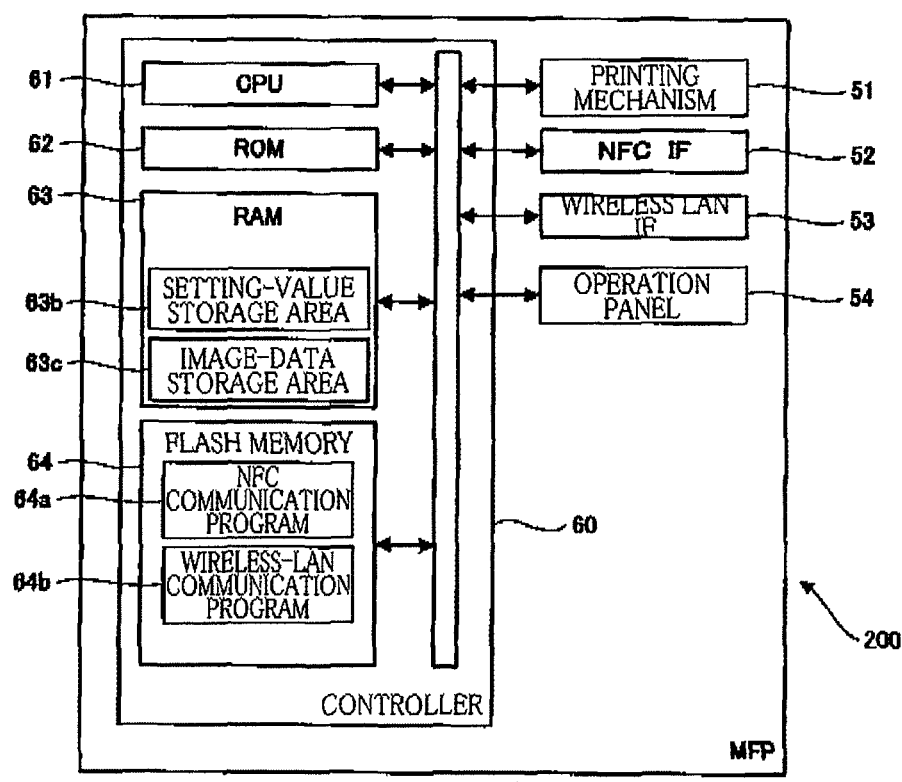
FIG. 2 is a block diagram illustrating an electric configuration of a multi-function peripheral (MFP) illustrated in FIG. 1.

There will be next explained an overall structure of the MFP 200. As illustrated in FIG. 1, the MFP 200 includes a generally rectangular parallelepiped housing 201. As illustrated in FIG. 2, the MFP 200 includes: a printing mechanism 51 (as one example of an image recording mechanism) for printing an image on a sheet; an NFC interface 52 (as one example of an image-recording-apparatus first communication device); a wireless LAN interface 53 (as one example of an image-recording-apparatus second communication device); an operation panel 54 for displaying an operating state and receiving or accepting an input operation of the user, and a controller 60 for controlling operations of the MFP 200.

Like an NFC interface 15 of the mobile terminal 100, the NFC interface 52 is an interface which allows the MFP 200 to perform NFC communication. Like a wireless LAN interface 16 of the mobile terminal 100, the wireless LAN interface 53 is an interface which allows the MFP 200 to perform WFD communication.

As illustrated in FIG. 1, the operation panel 54 is provided on an upper face of the housing 201 and includes: an input unit 57 for receiving or accepting an input of the user; a display 58 for displaying messages and settings; and an NFC reading surface 59 for establishing NFC communication. This NFC reading surface 59 is a component of the NFC interface 52 and extends parallel to the horizontal plane. While a power of the MFP 200 is ON, the MFP 200 can detect a device capable of performing NFC communication, based on a signal transmitted from the NFC interface 52. In the present embodiment, when the user has brought the mobile terminal 100 near the NFC reading surface 59 in a state in which a reference face 102 of the mobile terminal 100 is parallel to the NFC reading surface 59 of the NFC interface 52, the MFP 200 detects the mobile terminal 100 and establishes NFC communication with the mobile terminal 100.

There will be next explained the controller 60 of the MFP 200 in detail. As illustrated in FIG. 2, the controller 60 includes: a CPU 61, a ROM 62, a RAM 63, and a flash memory 64. The ROM 62 stores various settings and firmware as control programs for controlling the MFP 200. The RAM 63 and the flash memory 64 are used as a working area from which the control programs are read or as a storage area for temporarily storing data.

The RAM 63 includes: a setting-value storage area 63b for storing setting values or commands of a plurality of setting items for printing to be performed by the printing mechanism 51 (each hereinafter may be referred to as "print setting item"); and an image-data storage area 63c for storing image data transmitted from the mobile terminal 100.

In the present embodiment, the print setting items include a printing-surface setting item and a printing-orientation setting item. The printing-surface setting item is a print setting item for determining which of duplex printing and simplex printing is to be used, and "DUPLEX PRINTING" and "SIMPLEX PRINTING" are provided as setting values for the printing-surface setting item. The printing-orientation setting item is a setting item for determining a printing orientation of an image with respect to a sheet, and "PORTRAIT PRINTING" and "LANDSCAPE PRINTING" are provided as setting values for the printing-orientation setting item.

The flash memory 64 stores the WFD connection information for establishing WFD communication between the MFP 200 and the mobile terminal 100. This WFD connection information includes: a service set identifier (SSID) for identifying the WFD network a password; and information unique to the MFP 200 such as an IP address.

The flash memory 64 further stores various applications for causing the MFP 200 to execute its function. These applications include; an NFC communication program 64a for performing NFC communication using the NFC interface 52; and a wireless-LAN communication program 64b for performing WFD communication using the wireless LAN interface 53.

The CPU 61 executes various processings while storing results of calculations into the RAM 63 or the flash memory 64 according to the control programs read from the ROM 62 and the programs read from the flash memory 64. The CPU 61 also controls the applications stored in the flash memory 64.

<Structure of Mobile Terminal>

There will be next explained an overall structure of the mobile terminal 100. As illustrated in FIG. 1, the mobile terminal 100 includes a generally rectangular parallelepiped housing 101. One of six faces of the housing 101 is a rectangular face on which operation keys 11 and a touch panel 12 are arranged along a longitudinal direction of the one face.

Hereinafter, the face on which the operation keys 11 and the touch panel 12 are arranged will be referred to as "reference face 102". Also, one of the six faces of the housing 101 which is parallel to the reference face 102 will be referred to as "back face 103" (see FIG. 4A) which is opposite the reference face 102. Also, reference coordinates for the mobile terminal 100 are defined by the X axis, the Y axis, and the Z axis which are perpendicular to each other. The X axis extends in a widthwise direction of the reference face 102, and a positive direction of the X axis extends in a predetermined direction. The Y axis extends along a longitudinal direction of the reference face 102, and a positive direction of the Y axis extends in a direction directed from the operation keys 11 to the touch panel 12. The Z axis extends perpendicularly to the reference face 102, and a positive direction of the Z axis extends in a direction directed from the back face 103 to the reference face 102.

As illustrated in FIG. 3A, the mobile terminal 100 includes: the NFC interface 15 (as one example of a mobile-terminal first communication device) and the wireless LAN interface 16 (as one example of a mobile-terminal second communication device) as communication interfaces for allowing the mobile terminal 100 to communicate with an external device; a memory card interface 17 on which a memory card 17a (as one example of a storage) can be removably mounted; a sensor 20 for outputting a signal representative of an attitude or a position of the mobile terminal 100 (hereinafter may be referred to as "attitude signal"); and a controller 30 for controlling operations of the mobile terminal 100. The memory card 17a stores image data owned by the user such as document files and data representative of photographs.

The NFC interface 15 allows the mobile terminal 100 to perform NFC communication according to the ISO/IEC 21481 standard or the ISO/IEC 18092 standard. The mobile terminal 100 uses the NFC interface 15 to transmit and receive data to and from an external device over NFC communication. The wireless LAN interface 16 allows the mobile terminal 100 to perform WFD communication according to IEEE 802.11 standard or any standard equivalent thereto. The mobile terminal 100 uses the wireless LAN interface 16 to transmit and receive data to and from an external device over WFD communication.

The sensor 20 is constituted by a gravity sensor 21 and an orientation sensor 22 and outputs the attitude signal representative of the attitude of the mobile terminal 100. Here, the attitude signal includes: a lower face signal representative of a face of the six faces of the housing 101 which is facing downward in the vertical direction (hereinafter simply referred to as "lower face"); and an orientation signal representative of an orientation of the mobile terminal 100, i.e., a direction in which the mobile terminal 100 is facing.

The gravity sensor 21 is a sensor for outputting a lower face signal. In the present embodiment, the gravity sensor 21 is constituted by a triaxial acceleration sensor, and the three axes respectively coincide with the X axis, the Y axis, and the Z axis of the reference coordinates for the mobile terminal 100. Based on acceleration in each of the three axes of the triaxial acceleration sensor, the gravity sensor 21 senses a gravity direction of the mobile terminal 100 to detect which one of the six faces of the housing 101 is facing downward in the vertical direction. Based on a result of this detection, the gravity sensor 21 outputs a lower face signal.

The orientation sensor 22 is a sensor for outputting an orientation signal. In the present embodiment, the orientation sensor 22 detects the true north based on a radio wave received from a PS satellite. The orientation sensor 22 detects an orientation of the mobile terminal 100 based on an angle, with respect to the true north, of a vector obtained by projecting the positive direction of the Y axis of the mobile terminal 100 onto the horizontal plane. Based on a result of this detection, the orientation sensor 22 outputs an orientation signal. It is noted that the orientation sensor 22 may detect the orientation of the mobile terminal 100 using magnetic north.

There will be next explained the controller 30 of the mobile terminal 100. As illustrated in FIG. 3A, the controller 30 includes a CPU 31, a ROM 32, a RAM 33, and a flash memory 34. The ROM 32 stores various settings and firmware as control programs for controlling the mobile terminal 100. The RAM 33 and the flash memory 34 are used as a working area from which the control programs are read or as a storage area for temporarily storing data.

The flash memory 34 stores the WFD connection information for establishing WFD communication with the MFP 200. This WFD connection information includes: an SSID for identifying the WFD network; a password; and information unique to the mobile terminal 100 such as an IP address.

On the flash memory 34 are installed various programs such as an OS and device drivers for controlling various devices. The flash memory 34 also stores various applications for causing the mobile terminal 100 to execute its function. These applications include: an NFC communication program 34a for causing the mobile terminal 100 to perform NFC communication using the NFC interface 15; a wireless-LAN communication program 34b for causing the mobile terminal 100 to perform WFD communication using the wireless LAN interface 16; an image-data transmission program 34c; an attitude-signal obtaining program 34d; a change-information creating program 34e; and a setting-value setting program 34f.

The image-data transmission program 34c is designed to cause the mobile terminal 100 to use WFD communication to transmit image data to be printed which is selected by the user, to the MFP 200 via the wireless-LAN communication program 34b.

The attitude-signal obtaining program 34d is designed to, during the NFC communication, obtain attitude signals transmitted from the sensor 20, on a predetermined cycle and store the obtained attitude signals into the RAM 33 successively. Also, the CPU 31 executing the attitude-signal obtaining program 34d deletes all the attitude signals stored in the RAM 33 when a first predetermined length of time (as one example of a first period) has passed from disconnection of the NFC communication.

The change-information creating program 34e is designed to, based on the attitude signals stored in the RAM 33, causing the mobile terminal 100 to create change information representative of a change of the attitude of the mobile terminal 100. In the present embodiment, the CPU 31 sets an attitude signal stored upon establishment of NFC communication, as starting attitude information, then calculates a difference between the starting attitude information and the attitude signal stored on each cycle, and sets the calculated difference as the change information. This change information includes: lower-face change information created based on the lower face signal contained in the attitude signal; and orientation change information created based on the orientation signal contained in the attitude signal.

Figure 4A:
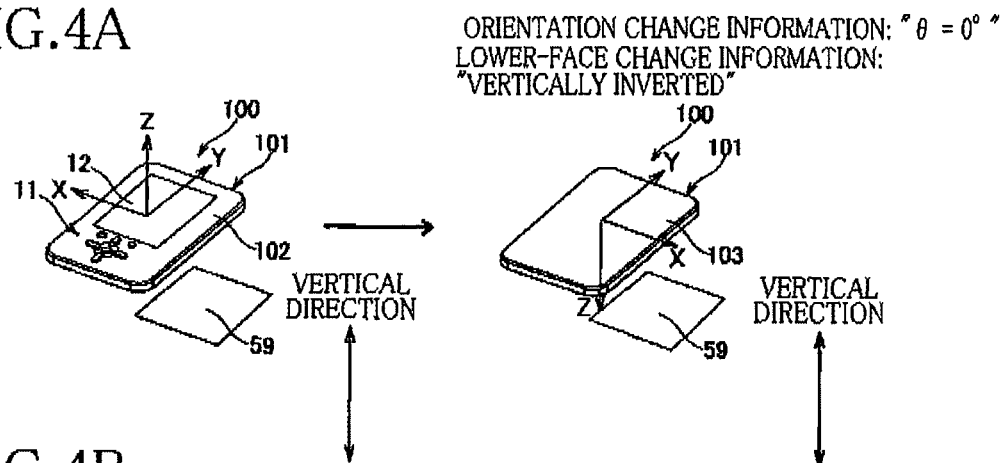
FIGS. 4A-4C are views each for explaining change information which represents an attitude of the mobile terminal illustrated in FIG. 1.
Figure 4B:
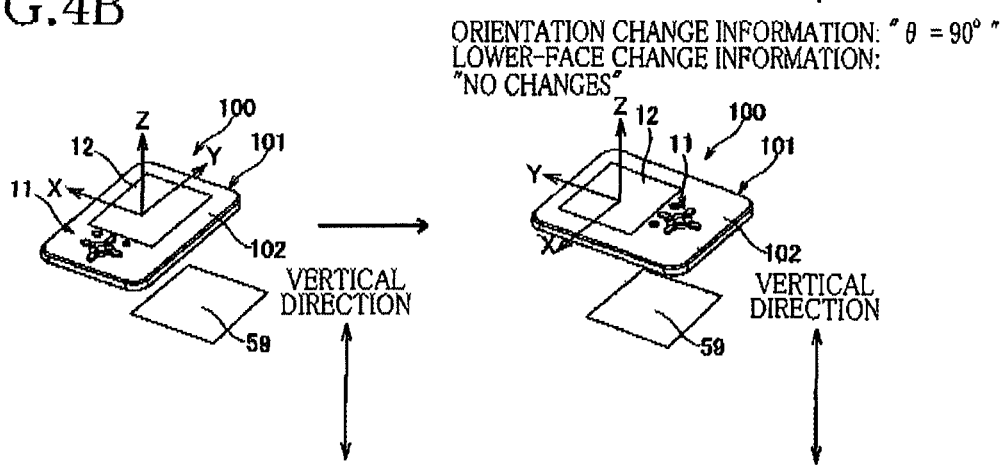
Figure 4C:
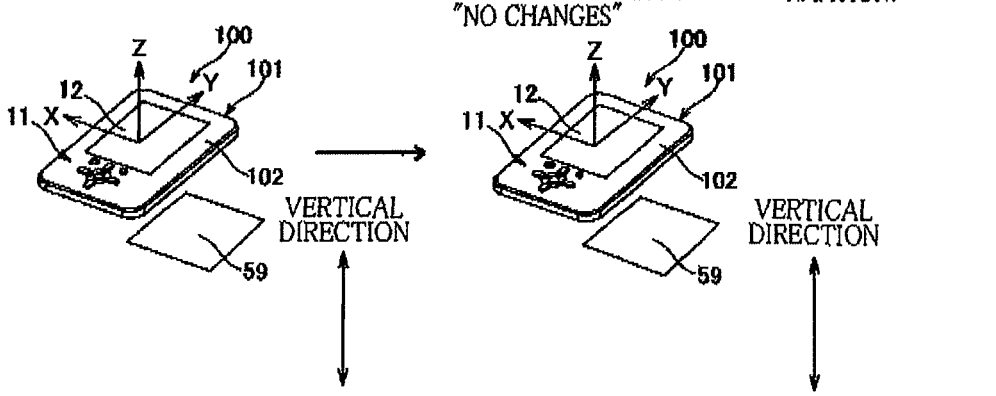

As described above, in the present embodiment, the NFC communication is established between the mobile terminal 100 and the MFP 200 when the user has brought the mobile terminal 100 near the NFC reading surface 59 in the state in which the reference face 102 of the mobile terminal 100 is parallel to the NFC reading surface 59 that is parallel to the horizontal plane. Thus, the lower face signal contained in the attitude signal received by the mobile terminal 100 indicates a positional relationship between the reference face 102 and the back face 103 in the vertical direction. Accordingly, one of "VERTICALLY INVERTED" and "NO CHANGES" is determined as the lower-face change information created based on the lower face signal. As illustrated in FIG. 4A, the "VERTICALLY INVERTED" represents that the positional relationship between the reference face 102 and the back face 103 in the vertical direction is changed or inverted, and as illustrated in FIGS. 4B and 4C the "NO CHANGES" represents that there is no change in the positional relationship between the reference face 102 and the back face 103 in the vertical direction.

The setting-value setting program 34f is designed to cause the mobile terminal 100 to set or update setting values for the print setting items, based on the change information created according to the change-information creating program 34e. Specifically, the setting-value setting program 34f includes predefined setting values for the printing-surface setting item and the printing-orientation setting item (i.e., default print setting values). In the present embodiment, the predefined setting value for the printing-surface setting item is "SIMPLEX PRINTING", and the predefined setting value for the printing-orientation setting item is "PORTRAIT PRINTING". At a point in time when the first NFC communication is established, the CPU 31 executing the setting-value setting program 34f transmits the default print setting values to the MFP 200 over NFC communication and stores the default print setting values into the setting-value storage area 63b of the MFP 200. Here, the wordings "at the point in time when the first NFC communication is established" is a point in time when NFC communication is established between the mobile terminal 100 and the MFP 200 for the first time after image data to be printed is selected by the user.

The setting-value setting program 34f further includes a printing-surface change table as a portion of reference information. As illustrated in FIG. 3B, the printing-surface change table represents a relationship between the lower-face change information about the mobile terminal 100 and the setting value for the printing-surface setting item. The printing-surface change table represents that the setting value for the printing-surface setting item is set at the command "SIMPLEX PRINTING" in the case where the lower-face change information is "NO CHANGES" and that the setting value for the printing-surface setting item is set at the command "DUPLEX PRINTING" in the case where the lower-face change information is "VERTICALLY INVERTED" (i.e., "CHANGED").

The setting-value setting program 34f further includes a printing-orientation change table as a portion of the reference information. As illustrated in FIG. 3C, the printing-orientation change table represents a relationship between the orientation change information about the mobile terminal 100 and the setting value for the printing-orientation setting item. The printing-orientation change table represents that the setting value for the printing-orientation setting item is set at the command "PORTRAIT PRINTING" in a case where the change angle θ represented by the orientation change information satisfies any of "0°≤θ≤45°" and "135°≤θ≤180°" (that is, in a case where the change angle θ is not changed substantially) and that the setting value for the printing-orientation setting item is set at the command "LANDSCAPE PRINTING" in a case where the change angle θ represented by the orientation change information satisfies "45°≤θ≤135°" (that is, in a case where the mobile terminal 100 is rotated 90 degrees substantially).

Figure 5:
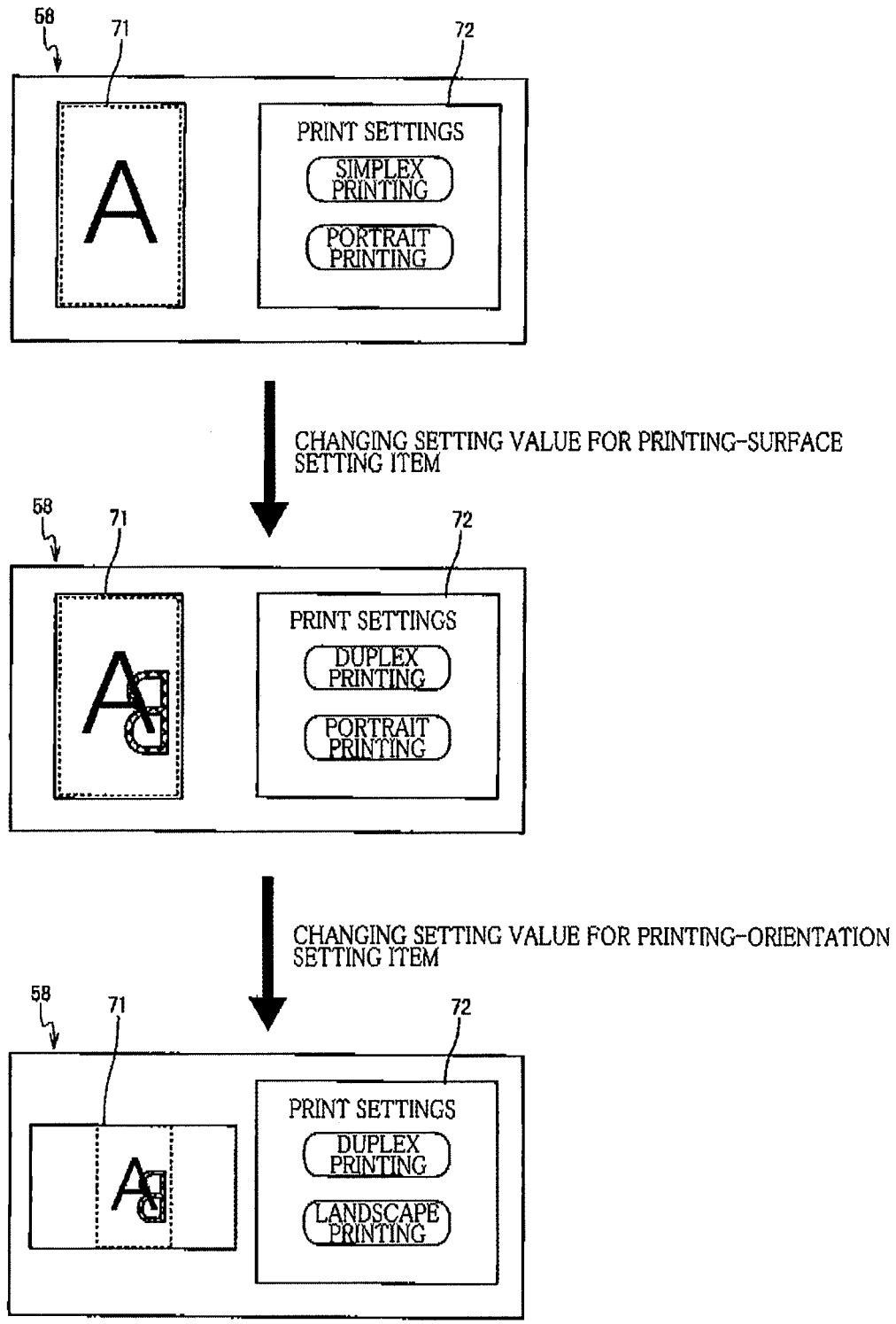
FIG. 5 is a view illustrating images displayed on a display of an operation panel of the MFP illustrated in FIG. 1.

Each time when at least one of the setting values for the print setting items is updated, the setting-value setting program 34f causes the mobile terminal 100 to use NFC communication to transmit information about the update to the MFP 200. In this operation, as illustrated in FIG. 5, the CPU 31 executing the setting-value setting program 34f controls the display 58 of the operation panel 54 of the MFP 200 to display information corresponding to the setting values for the print setting items in the form of an image 71 and a text image 72. The image 71 indicates a relationship between a sheet indicated by the solid line in FIG. 5 and an outline of a print area indicated by the broken line in FIG. 5 on which an image is to be printed on the sheet based on image data to be printed and indicates a relationship between an orientation of the sheet and an orientation of the image to be printed on the sheet. Also, the image 71 indicates a relationship between a face or faces of a sheet and an image or images to be printed on the face(s) of the sheet. The text image 72 is text information about the setting values for the print setting items. Each time when at least one of the setting values for the print setting items is updated, the CPU 31 executing the setting-value setting program 34f also updates the image 71 and the text image 72 displayed on the display 58.

Figure 8:
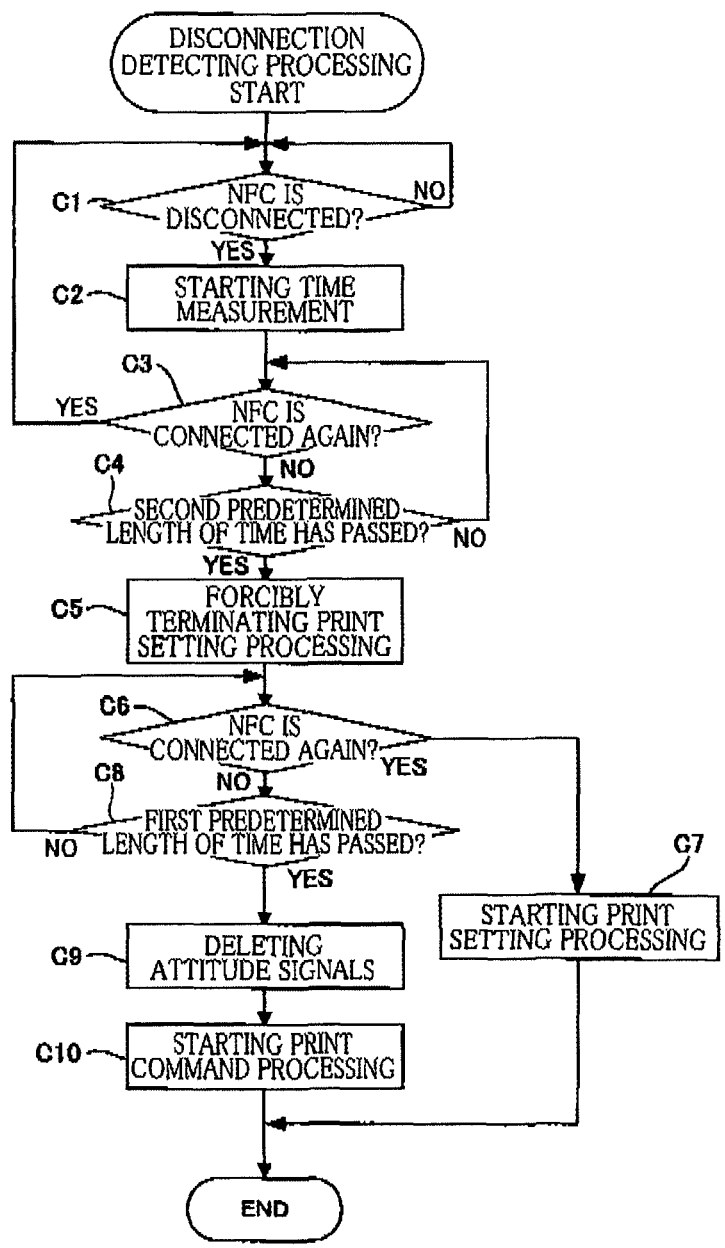
FIG. 8 is a flow chart illustrating a disconnection detecting processing illustrated in FIG. 7.

The setting-value setting program 34f is also designed to cause the mobile terminal 100 to determine the setting values for the print setting items and executes a print command processing in a case where, after NFC communication established between the mobile terminal 100 and the MFP 200 is disconnected, NFC communication is not established again by the time when the first predetermined length of time, e.g., 30 seconds, has passed from the disconnection (in a disconnection detecting processing illustrated in FIG. 8). In the print command processing, WFD communication is established between the mobile terminal 100 and the MFP 200, and image data to be printed is transmitted from the mobile terminal 100 to the MFP 200 over the WFD communication. Having received the image data, the MFP 200 prints an image on a sheet based on the image data.

The CPU 31 executes various processings while storing results of calculations into the RAM 33 or the flash memory 34 according to the control programs read from the ROM 32 and the programs read from the flash memory 34. The CPU 31 also controls the applications stored in the flash memory 34.

<Overview of Image-Data Transmission Program and Set-Value Setting Program>

Figure 6:
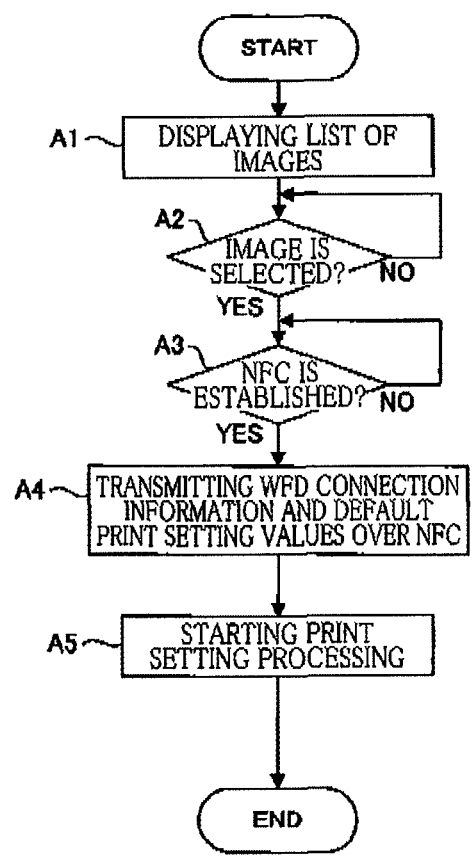
FIG. 6 is a flow chart illustrating an operation flow of the mobile terminal illustrated in FIG. 1.
Figure 7:
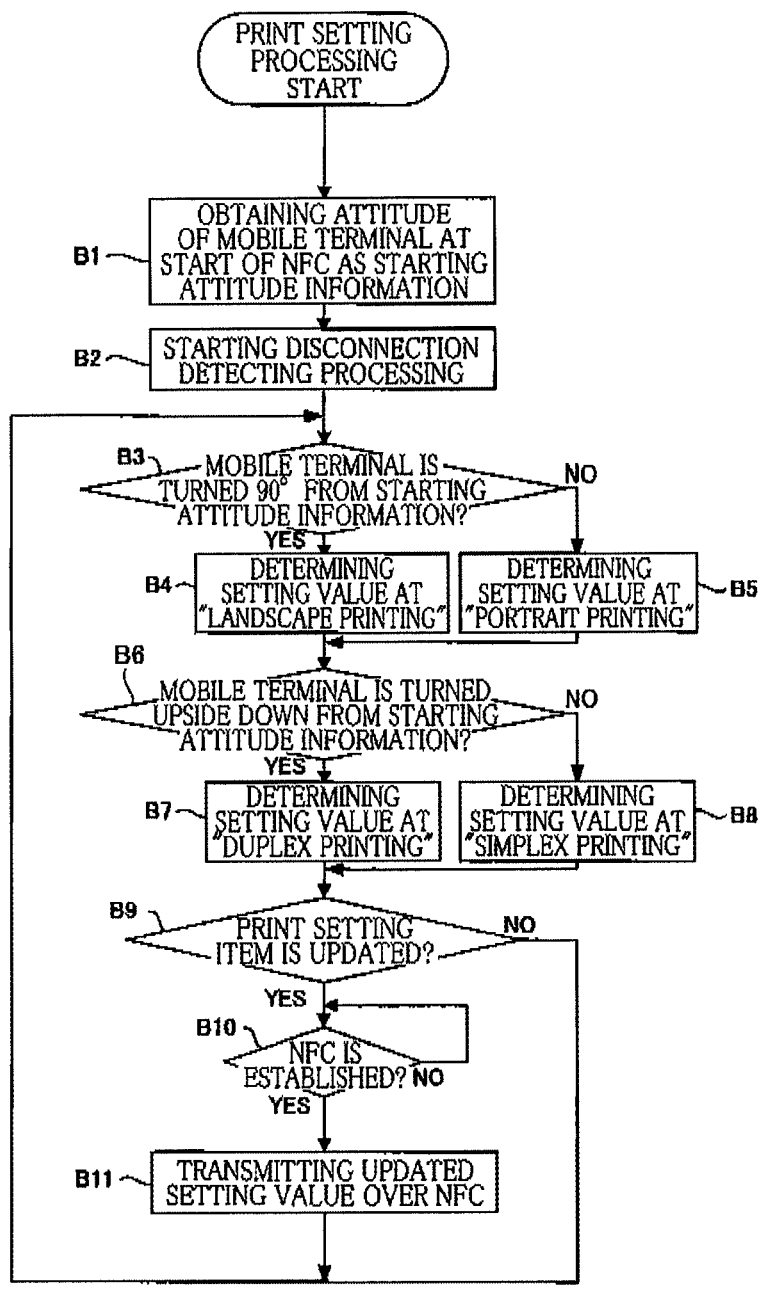
FIG. 7 is a flow chart illustrating a print setting processing illustrated in FIG. 6.

There will be next explained, with reference to FIGS. 6-8, processings to be executed by the CPU 31 of the mobile terminal 100 according to the image-data transmission program 340 and the setting-value setting program 34f installed on the mobile terminal 100.

Set-Value Setting Program

The flow in FIG. 6 begins with A1 at which the CPU 31 controls the touch panel 12 to display, as an initial screen, a list of images based on image data stored in the memory card 17a, by file names or thumbnail images. The user then selects image data to be printed from the list of the images based on the image data (A2: YES). After the selection of the image data to be printed, when the user has brought the mobile terminal 100 into close proximity to the NFC reading surface 59 of the MFP 200, the MFP 200 detects the mobile terminal 100 and establishes NFC communication between the mobile terminal 100 and the MFP 200. The CPU 31 at A3 determines whether the NFC communication has been established or not. When the NFC communication is not established (A3: NO), the CPU 31 controls the touch panel 12 to display an image for prompting the user to bring the mobile terminal 100 near the NFC reading surface 59 of the MFP 200 and waits for the NFC communication to be established. When the NFC communication is established (A3: YES), the CPU 31 at A4 uses the NFC communication to transmit the WFD connection information and the default print setting values to the MFP 200. The CPU 31 at A5 starts a print setting processing illustrated in FIG. 7, and this flow ends.

There will be next explained the print setting processing with reference to FIG. 7. The print setting processing begins with B1 at which when the NFC communication is established, the CPU 31 obtains the attitude signal stored in the RAM 33 as the starting attitude information. The CPU 31 at B2 starts the disconnection detecting processing illustrated in FIG. 8 which will be explained later. Based on the orientation change information contained in the change information representative of the difference between the starting attitude information and the attitude signal stored on each cycle, the CPU 31 at B3 determines whether the mobile terminal 100 has been substantially rotated 90 degrees from its orientation represented by the starting attitude information or not. Specifically, the CPU 31 determines whether the change angle θ represented by the orientation change information falls within the range between 45° and 135° or not. When the change angle θ satisfies "45°<θ<135°" (B3: YES), the CPU 31 at B4 sets the setting value for the printing-orientation setting item at "LANDSCAPE PRINTING". When the change angle θ does not satisfy "45°≤θ<135°" (B13: NO), that is, when the change angle θ satisfies any of "0°≤θ≤45°" and "135°≤θ≤180°", the CPU 31 at B5 sets the setting value for the printing-orientation setting item at "PORTRAIT PRINTING".

Based on the lower-face change information contained in the change information, the CPU 31 determines at B6 whether the mobile terminal 100 has been turned upside down from its attitude represented by the starting attitude information or not. When the mobile terminal 100 has been turned upside down, the CPU 31 at B7 sets the setting value for the printing-surface setting item at "DUPLEX PRINTING". When the mobile terminal 100 has not been turned upside down, the CPU 31 at B8 sets the setting value for the printing-surface setting item at "SIMPLEX PRINTING". It is noted that the setting value for each of the printing-orientation setting item and the printing-surface setting item is updated only when the setting value is updated to a different value.

The CPU 31 at B9 determines whether any of the print setting items has been updated or not. When any of the print setting items is not updated, this flow returns to B3. When any of the print setting items is updated, the CPU 31 waits for NFC communication to be established (B10: NO). When the NFC communication is established (B10: YES), the CPU 31 at B11 uses the NFC communication to transmit the updated setting value(s) for the print setting item(s) to the MFP 200, and this flow returns to B3. It is noted that the print setting processing is turned off by the disconnection detecting processing, which will be described below.

There will be next explained the disconnection detecting processing with reference to FIG. 8. The disconnection detecting processing begins with C1 at which the CPU 31 waits for the NFC communication to be disconnected (C1: NO). When the CPU 31 determines that the NFC communication is disconnected (C1: YES), the CPU 31 at C2 starts a time measurement. When the CPU 31 determines that the NFC communication has been connected again (C3: YES), this flow returns to C1. When the CPU 31 determines that the NFC communication has not been connected again (C3: NO), the CPU 31 at C4 determines whether or not the measured length of time is equal to or longer than a second predetermined length of time (as one example of a second period) that is shorter than the first predetermined length of time for determining or finalizing the setting values for the print setting items. When the measured length of time is shorter than the second predetermined length of time (C4: NO), this flow returns to C3 at which the CPU 31 determines whether the NFC communication has been connected again or not. When the measured length of time is longer than the second predetermined length of time (C4: YES), the CPU 31 at C5 forcibly terminates the print setting processing. As a result, the setting values for the print setting items are temporarily determined.

The CPU 31 at C6 determines whether the NFC communication has been connected again or not. When the NFC communication has been connected again (C6: YES), the CPU 31 at C7 starts the print setting processing again. That is, print settings are set again. When the NFC communication has not been connected again (C6: NO), the CPU 31 repeats the processing at C6 until the first predetermined length of time has passed (C8: NO). When the first predetermined length of time has passed from the start of the time measurement (C8: YES), the CPU 31 at C9 deletes all the stored attitude signals and at C10 starts the print command processing, and the disconnection detecting processing in FIG. 8 ends. It is noted that each time when the setting value transmitted from the mobile terminal 100 is received, the MFP 200 overwrites the corresponding setting value stored in the setting-value storage area 63b with the received setting value (for example, the print setting is changed from "LANDSCAPE PRINTING" to "PORTRAIT PRINTING"). Also, the MFP 200 finalizes or fixes the print settings when having received image data transmitted from the mobile terminal 100 in the print command processing.

Image-Data Transmission Program

Figure 9:
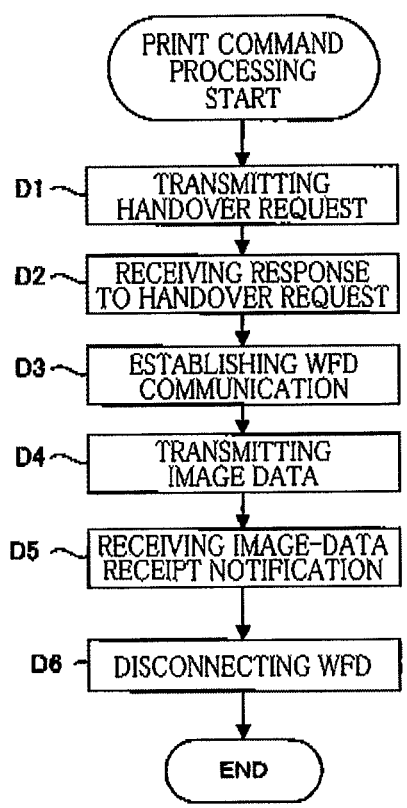
FIG. 9 is a flow chart illustrating a print command processing illustrated in FIG. 8.

There will be next explained the print command processing with reference to FIG. 9. The print command processing begins with D1 at which the CPU 31 transmits a handover request to the MFP 200. The CPU 31 at D2 receives a response to the handover request from the MFP 200.

The CPU 31 at D3 establishes WFD communication between the mobile terminal 100 and the MFP 200. That is, a handover from the NFC communication to the WFD communication is performed. Upon the establishment of the WFD communication between the mobile terminal 100 and the MFP 200, the CPU 31 at D4 uses the WFD communication to send the MFP 200 image data to be printed which is selected by the user. Thereafter, the CPU 31 at D5 receives a notification about receipt of the image data (hereinafter may be referred to as "image-data receipt notification") from the MFP 200. The image-data receipt notification is a notification which is transmitted from the MFP 200 to the mobile terminal 100 over the WFD communication when the MFP 200 has received the image data transmitted from the mobile terminal 100. At D6, the CPU 31 disconnects the WFD communication between the mobile terminal 100 and the MFP 200, and this flow illustrated in FIG. 9 ends.

<Procedure of Data Communication Between Devices>

Figure 10:
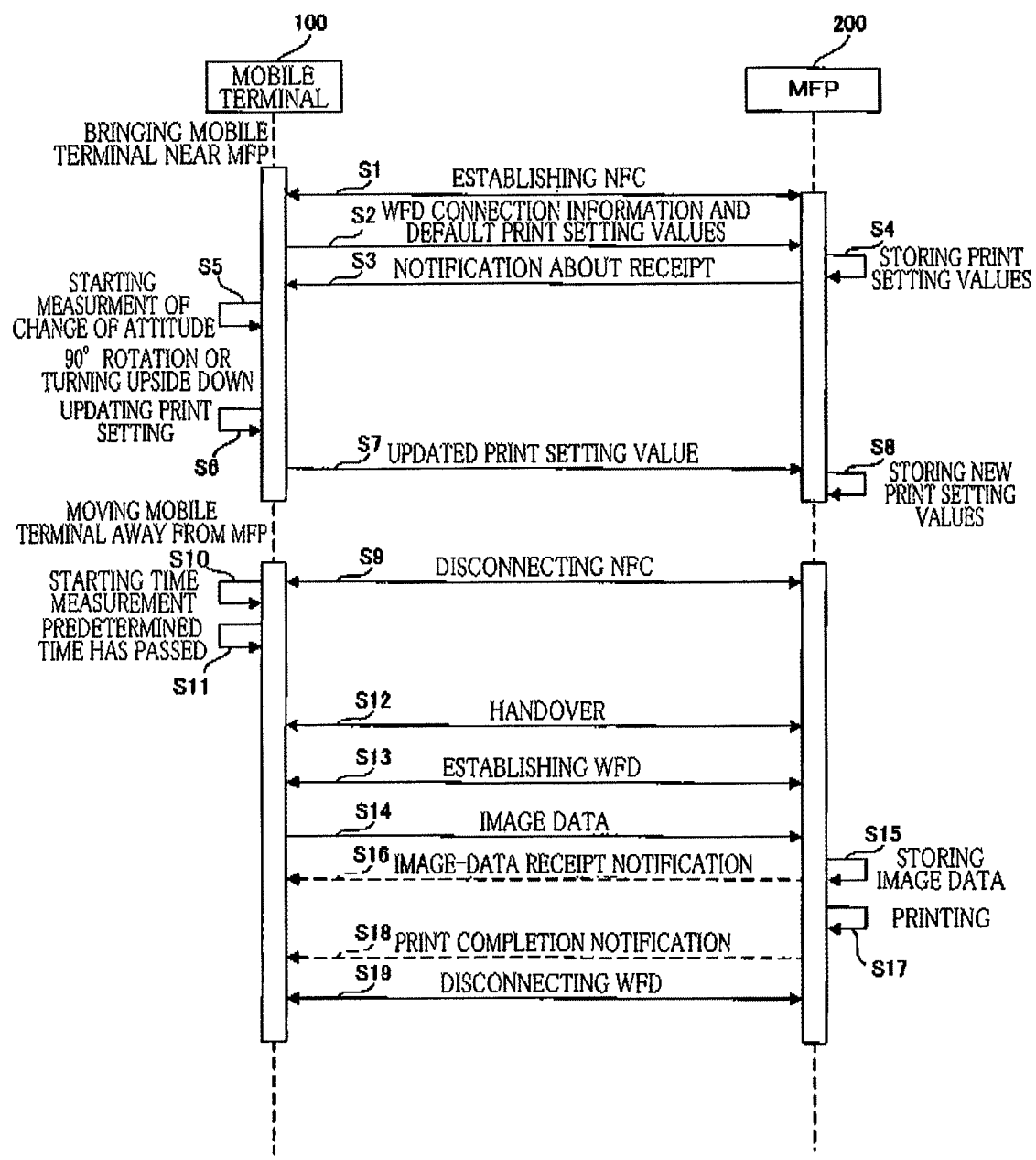
FIG. 10 is a sequence diagram illustrating a procedure of data communication between the mobile terminal and the MFP.

There will be next explained, with reference to FIG. 10, a procedure of data communication between the mobile terminal 100 and the MFP 200. As illustrated in FIG. 10, NFC communication is established at S1 when the user has brought the mobile terminal 100 near the NFC reading surface 59 of the MFP 200 in a state in which image data to be printed is selected by the user. When the NFC communication is established, the mobile terminal 100 at S2 transmits the communication information about the WFD communication and the default print setting values to the MFP 200. When the communication information and the default print setting values are received, the MFP 200 at S3 transmits a notification about the receipt to the mobile terminal 100 and at S4 stores the received default print setting values into the setting-value storage area 63b.

The mobile terminal 100 at S5 starts measuring or detecting a change of the attitude of the mobile terminal 100. Each time when any of the values for the print setting items is updated in response to a change of the attitude of the mobile terminal 100 by the user (e.g., rotation by 90 degrees or turning upside down) (S6), the mobile terminal 100 at S7 transmits the updated print setting value or values to the MFP 200. The MFP 200 at S8 stores the received new print setting value(s) into the setting-value storage area 63b. When the mobile terminal 100 is moved away from the NFC reading surface S9 of the MFP 200, and the NFC communication is disconnected (S9), the mobile terminal 100 at 510 starts measuring a time. When NFC communication has not been connected or established again when the first predetermined length of time has passed from the disconnection (S11), the print setting items are finalized or determined. Also in the MFP 200, the print setting items are finalized when image data is transmitted in the print command processing.

The mobile terminal 100 and the MFP 200 at S12 performs a handover to establish the WFD communication. At S13, the WFD communication is established between the mobile terminal 100 and the MFP 200. The mobile terminal 100 at S14 transmits image data to be printed, to the MFP 200 over the WFD communication. The MFP 200 at S15 stores the received image data into the image-data storage area 63c of the RAM 63 and at S16 transmits the image-data receipt notification to the mobile terminal 100 over the WFD communication.

The MFP 200 at S17 uses the setting values for the print setting items stored in the setting-value storage area 63b to print an image on a sheet based on the image data stored in the image-data storage area 63c. Upon completion of the printing, the MFP 200 at S18 uses the WFD communication to transmit a print completion notification to the mobile terminal 100. At S19, the WFD communication between the mobile terminal 100 and the MFP 200 is disconnected.

In the present embodiment, the user can set the setting values for the print setting items of the MFP 200 by changing the attitude of the mobile terminal 100 when the NFC communication is established. Accordingly, the user can more easily set the setting values for the print setting items.

In the present embodiment, the setting values for the print setting items are temporarily determined in the case where NFC communication is established again by the time when a length of time measured from disconnection of NFC communication reaches the second predetermined length of time. Accordingly, printing can be performed speedily by determining that the user has no intention of changing the setting value or values for the print setting items when the user has intentionally moved the mobile terminal 100 away from the NFC reading surface S9 by equal to or longer than the communicable distance.

In the present embodiment, attitude signals are stored until the second predetermined length of time has passed from disconnection of the NFC communication. Accordingly, changing the print settings requires only changes of the attitude of the mobile terminal 100 which are mostly performed within the communicable range.

In the present embodiment, all the stored attitude signals are deleted when a length of time measured from disconnection of the NFC communication becomes equal to or longer than the first predetermined length of time. Accordingly, a new attitude signal can be reliably stored when the next print command processing is executed.

In the present embodiment, each time when the print setting is updated before the NFC communication is disconnected, the setting value is transmitted to the MFP 200, making it possible to use only operations of the mobile terminal 100 which are performed by the user within the communicable range.

<Modifications>

Figure 11:
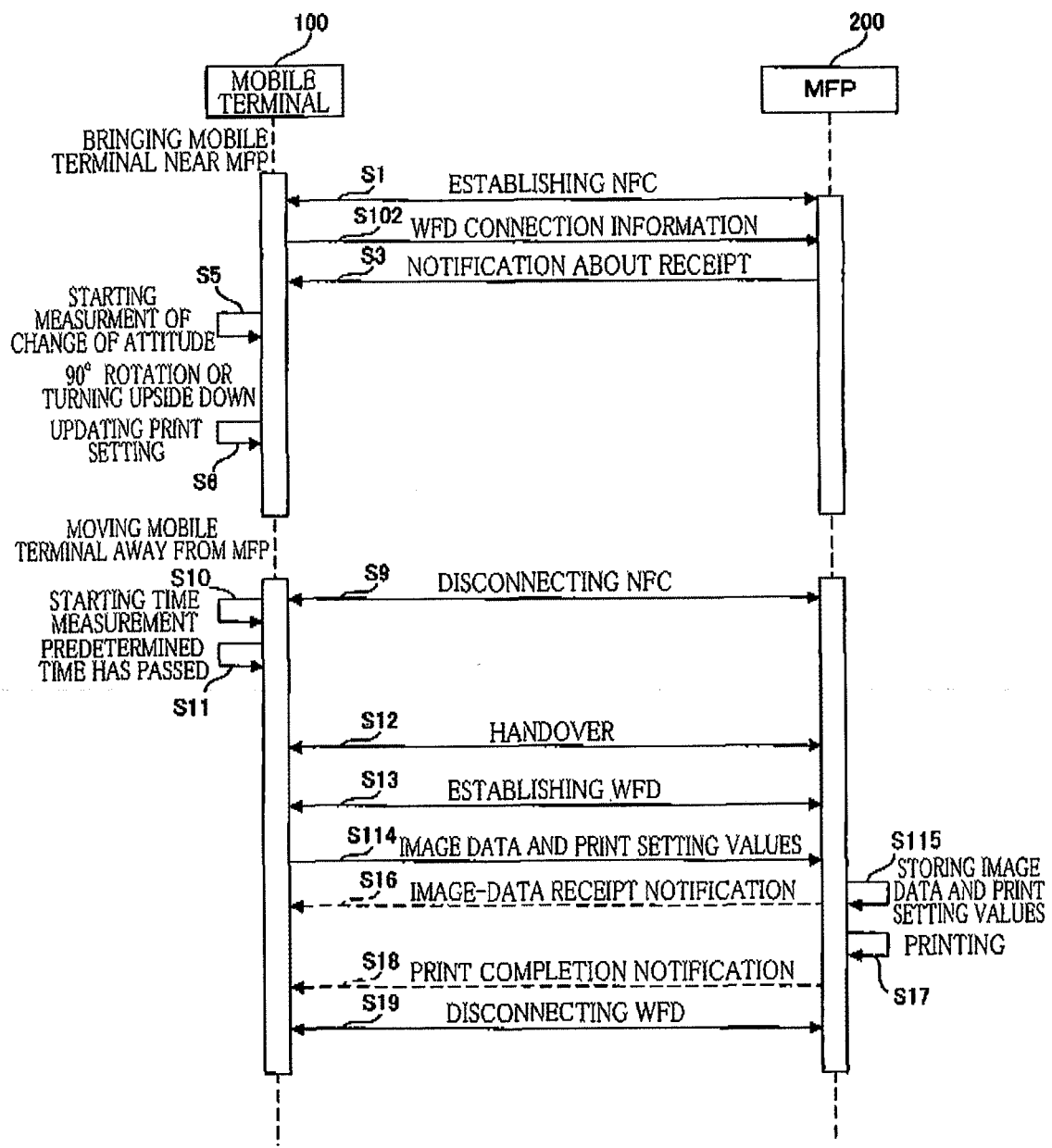
FIG. 11 is a sequence diagram illustrating a procedure of data communication between a mobile terminal and a MFP according to a modification.
Figure 12:
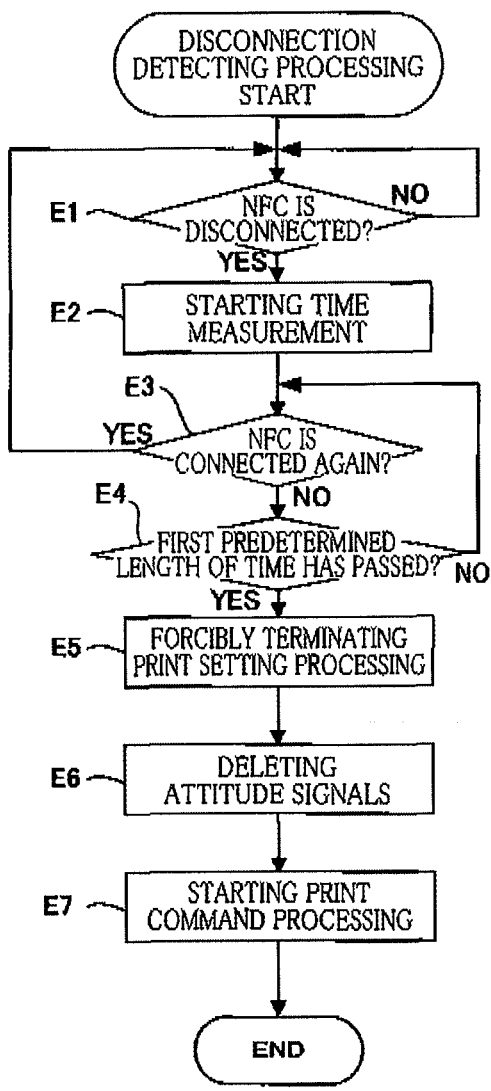
FIG. 12 is a flow chart illustrating a disconnection detecting processing in another modification.

There will be next explained a first modification of the present embodiment. The setting values for the print setting items are transmitted to the MFP 200 over the NFC communication in the above-described embodiment but may be transmitted over the WFD communication. For example, as illustrated in FIG. 11, when the NFC communication is established (S1), the mobile terminal 100 at S102 transmits only the communication information to the MFP 200 (without the default print setting values). After the WFD communication is established (S13), the mobile terminal 100 at S114 uses the WFD communication to transmit the image data and the setting values for the print setting items to the MFP 200. The MFP 200 at S115 stores the received setting values into the setting-value storage area 63*b*. It is noted that the other processings may be the same as those in the above-described embodiment except for that the updated setting values are not transmitted over the NFC communication, There will be next explained a second modification of the present embodiment. In the above-described embodiment, when a length of time measured from disconnection of the NFC communication becomes equal to or longer than the second predetermined length of time, the print setting items are temporarily determined, and thereafter when the NFC communication is not established again by the time when the measured length of time becomes equal to or longer than the first predetermined length of time, the print setting items are finally determined. However, the second predetermined length of time and the first predetermined length of time may be equal to each other. For example, as illustrated in FIG. 12, the disconnection detecting processing begins with E1 at which the CPU 31 waits for the NFC communication to be disconnected (E1: NO). When the CPU 31 determines that the NFC communication is disconnected (E1: YES), the CPU 31 at E2 starts a time measurement. When the CPU 31 determines that the NFC communication has been connected again (E3: YES), this flow returns to E1. When the CPU 31 determines that the NFC communication has not been connected (E3: NO), the CPU 31 repeats the processing at E3 until the first predetermined length of time has passed (E4: NO). When the first predetermined length of time has passed (E4: YES), the CPU 31 finalizes the print setting items. The CPU 31 at E5 forcibly terminates the print setting processing, at E6 deletes all the stored attitude signals, and at E7 starts the print command processing, and the disconnection detecting processing in FIG. 12 ends.

While the embodiment of the present invention has been described above, it is to be understood that the invention is not limited to the details of the illustrated embodiment, but may be embodied with various changes and modifications, which may occur to those skilled in the art, without departing from the spirit and scope of the invention. For example, in the above-described embodiment, the NFC communication and the WFD communication are respectively employed as the first wireless communication and the second wireless communication, and the handover from the NFC communication to the WFD communication is performed, but the present invention is not limited to this configuration. That is, any two communication standards may be employed as long as these two communication standards have different communication distances. For example, the second wireless communication may be a non-direct Wi-Fi (R) according to which communication is performed via an access point. Alternatively, the second wireless communication may be the Bluetooth (R).

In the above-described embodiment, the printing-surface setting item and the printing-orientation setting item are used as the print setting items for which setting value are set based on the change information, but the present invention is not limited to this configuration. For example, a print setting item whose set values are "COLOR PRINTING" and "BLACK/WHITE PRINTING" may be provided, and the setting value for the print setting item may be changed based on the change information.

While the mobile terminal 100 transmits the setting values for the print setting items to the MFP 200 in the above-described embodiment, the mobile terminal 100 may transmit the change information (i.e., the lower-face change information and/or the orientation change information). In this configuration, the printing-surface change table and the printing-orientation change table are stored in the MFP 200. The MFP 200 reads a setting value for a print setting item corresponding to the received change information, from one of the printing-surface change table and the printing-orientation change table and stores the read set value as a new setting value.

While the NFC reading surface 59 of the MFP 200 is parallel to the horizontal plane in the above-described embodiment, the NFC reading surface 59 may have a different construction. For example, the NFC reading surface 59 may be parallel to the vertical plane. In this construction, the gravity sensor 21 only needs to output, as a signal corresponding to the orientation signal, a signal corresponding to a signal indicative of an angle, with respect to the vertical direction, of a vector obtained by projecting the positive direction of the Y axis of the mobile terminal 100 onto the vertical plane. Also, the orientation sensor 22 only needs to output, as a signal corresponding to the lower face signal, a signal indicative of a positional relationship of the reference face 102 and the back face 103 of the mobile terminal 100 with respect to the NFC reading surface 59 based on an angle, with respect to the true north, of a vector obtained by projecting the positive direction of the Z axis of the mobile terminal 100 onto the horizontal plane.

In the above-described embodiment, when the first NFC communication is established, the mobile terminal 100 and the MFP 200 transfer the WFD connection information about the mobile terminal 100 and the MFP 200 to each other, but the WFD connection information may be transmitted in only one direction from one device to another device. For example, when the first NFC communication is established, only the WFD connection information about the mobile terminal 100 may be transmitted from the mobile terminal 100 to the MFP 200 over the NFC communication. In this configuration, the information unique to the MFP 200 which is required for the mobile terminal 100 to identify the MFP 200 may be transmitted from the MFP 200 to the mobile terminal 100 over the WFD communication.

The processings in the above-described embodiment may be executed by a single CPU, a plurality of CPUs, hardware such as ASIC, or a combination thereof. Also, the CPU may execute some of the processings according to the OS. Also, the processings in the embodiment may be executed by various forms such as instructions stored in a non-transitory recording medium and a method for executing the processings. Also, the image data and the WFD connection information about the mobile terminal may be stored in the same memory of the mobile terminal.

While all the stored attitude signals are deleted when a length of time measured from disconnection of the NFC communication becomes equal to or longer than the first predetermined length of time, but the stored attitude signals may not be deleted.

The sensor is not limited to that in the above-described embodiment, and any sensor may be used as long as the sensor outputs a signal relating to the attitude of the mobile terminal 100. The image recording apparatus is not limited to the MFP, and any device may be employed as the image recording apparatus as long as the device has the printing function.

What is claimed is:

1. An image recording system comprising:
    a mobile terminal; and
    an image recording apparatus configured to record an image on a recording medium,
    the mobile terminal comprising:
        a storage configured to store image data and a table comprising a plurality sets of reference information, the plurality sets of reference information each being in association with a corresponding one of a plurality of image recording conditions;
        a mobile-terminal first communication device configured to perform data communication with the image recording apparatus over first wireless communication which is established when a distance between the mobile terminal and the image recording apparatus is less than a communicable distance;
        a mobile-terminal second communication device configured to perform data communication with the image recording apparatus over second wireless communication which is established based on communication setting information about the mobile terminal and the image recording apparatus;
        a position detector configured to output a signal representative of a position of the mobile terminal; and
        a mobile-terminal controller configured to control the mobile-terminal first communication device, the mobile-terminal second communication device, and the position detector,
    the mobile-terminal controller being configured to perform:
        establishing the first wireless communication between the mobile terminal and the image recording apparatus;
        at least one of (i) transmitting the communication setting information about the mobile terminal over the first wireless communication and (ii) receiving the communication setting information about the image recording apparatus over the first wireless communication;
        successively storing signals output by the position detector, while the first wireless communication between the mobile terminal and the image recording apparatus is established;
        determining a particular set of reference information in accordance with at least one of the signals stored;
        determining a particular image recording condition in association with the particular set of reference information;
        transmitting, to the image recording apparatus over one of the first wireless communication and the second wireless communication, a command for causing the image recording apparatus in accordance with the particular image recording condition;
        transmitting, to the image recording apparatus over the second wireless communication, image data based on which the image recording apparatus is to record an image among the image data stored in the storage,
    the image recording apparatus comprising:
        an image-recording-apparatus first communication device configured to perform data communication with the mobile terminal over the first wireless communication;
        an image-recording-apparatus second communication device configured to perform data communication with the mobile terminal over the second wireless communication;
        an image recording mechanism configured to record an image on a recording medium based on the image data; and
        an image-recording-apparatus controller configured to control the image-recording-apparatus first communication device, the image-recording-apparatus second communication device, and the image recording mechanism,
    the image-recording-apparatus controller being configured to perform:
        at least one of (i) receiving the communication setting information about the mobile terminal which is transmitted by the control of the mobile-terminal controller over the first wireless communication and (ii) transmitting the communication setting information about the image recording apparatus which is received by the control of the mobile-terminal controller over the first wireless communication; and
        controlling the image recording mechanism to use an image recording condition determined based on the command transmitted from the mobile terminal, to record an image based on the image data transmitted from the mobile terminal over the second wireless communication.

2. The image recording system according to claim 1, wherein the image-recording-apparatus controller is configured to control the image recording mechanism to use the particular image recording condition determined at a time point when a disconnected period has passed a first period, and wherein the disconnected period is a time period in which the first wireless communication is not established and which is continued from a start of disconnection of the first wireless communication established between the image recording apparatus and the mobile terminal.

3. The image recording system according to claim 2, wherein the mobile-terminal controller is configured to execute the storing until the disconnected period has passed a second period which is equal to or shorter than the first period.

4. The image recording system according to claim 3, wherein the mobile-terminal controller is configured to start the storing again when the first wireless communication is established again after the disconnected period has passed the second period and before the disconnected period reaches the end of the first period.

5. The image recording system according to claim 2, wherein the mobile-terminal controller is configured to delete all the signals stored, when the disconnected period has reached an end of the first period.

6. The image recording system according to claim 2, wherein the mobile-terminal controller is configured to, when the particular image recording condition is determined, transmit the command in accordance with the particular image recording condition, to the image recording apparatus over the first wireless communication, and
wherein the image-recording-apparatus controller is configured to, when the disconnected period has reached an end of the first period, determine the image recording condition based on the command transmitted from the mobile terminal by a time when the first wireless communication is disconnected.

7. The image recording system according to claim 1, wherein the mobile-terminal controller is configured not to transmit the command in accordance with the particular image recording condition to the image recording apparatus when a disconnected period has passed a first period, and wherein the disconnected period is a time period in which the first wireless communication is not established and which is continued from a start of disconnection of the first wireless communication established between the image recording apparatus and the mobile terminal.

8. The image recording system according to claim 7, wherein the mobile-terminal controller is configured to transmit the image data to the image recording apparatus over the second wireless communication when the disconnected period has passed the first period.

9. An image recording method in an image recording system comprising: a mobile terminal; and an image recording apparatus configured to record an image on a recording medium,
the mobile terminal comprising: a storage configured to store image data and a table comprising a plurality sets of reference information, the plurality sets of reference information each being in association with a corresponding one of a plurality of image recording conditions; a mobile-terminal first communication device configured to perform data communication with the image recording apparatus over first wireless communication which is established when a distance between the mobile terminal and the image recording apparatus is less than a communicable distance; a mobile-terminal second communication device configured to perform data communication with the image recording apparatus over second wireless communication which is established based on communication setting information about the mobile terminal and the image recording apparatus; and a position detector configured to output a signal representative of a position of the mobile terminal,
the image recording apparatus comprising: an image-recording-apparatus first communication device configured to perform data communication with the mobile terminal over the first wireless communication; an image-recording-apparatus second communication device configured to perform data communication with the mobile terminal over the second wireless communication; and an image recording mechanism configured to record an image on a recording medium based on the image data,
the image recording method comprising:
establishing the first wireless communication between the mobile terminal and the image recording apparatus;
performing at least one of (i) causing the mobile terminal to transmit the communication setting information about the mobile terminal over the first wireless communication and (ii) causing the mobile terminal to receive the communication setting information about the image recording apparatus over the first wireless communication;
causing the mobile terminal to successively store signals output by the position detector, while the first wireless communication between the mobile terminal and the image recording apparatus is established;
causing the mobile terminal to determine a particular set of reference information in accordance with at least one of the signals stored;
causing the mobile terminal to determine a particular image recording condition in association with the particular set of reference information;
causing the mobile terminal to transmit, to the image recording apparatus over one of the first wireless communication and the second wireless communication, a command for causing the image recording apparatus in accordance with the particular image recording condition;
causing the mobile terminal to transmit, to the image recording apparatus over the second wireless communication, image data based on which the image recording apparatus is to record an image among the image data stored in the storage;
performing at least one of (i) causing the image recording apparatus to receive the communication setting information about the mobile terminal which is transmitted over the first wireless communication and (ii) causing the image recording apparatus to transmit the communication setting information about the image recording apparatus which is received over the first wireless communication; and
causing the image recording mechanism to use an image recording condition determined based on the command transmitted from the mobile terminal, to record an image based on the image data transmitted from the mobile terminal over the second wireless communication.

10. A mobile terminal comprising:
a storage configured to store image data and a table comprising a plurality sets of reference information, the plurality sets of reference information each being in association with a corresponding one of a plurality of image recording conditions;
a mobile-terminal first communication device configured to perform data communication with the image recording apparatus over first wireless communication which is established when a distance between the mobile terminal and the image recording apparatus is less than a communicable distance;
a mobile-terminal second communication device configured to perform data communication with the image recording apparatus over second wireless communication which is established based on communication setting information about the mobile terminal and the image recording apparatus;
a position detector configured to output a signal representative of a position of the mobile terminal; and
a mobile-terminal controller configured to control the mobile-terminal first communication device, the mobile-terminal second communication device, and the position detector,
the mobile-terminal controller being configured to perform:
establishing the first wireless communication between the mobile terminal and the image recording apparatus;
at least one of (i) transmitting the communication setting information about the mobile terminal over the first wireless communication and (ii) receiving the communication setting information about the image recording apparatus over the first wireless communication;
successively storing signals output by the position detector, while the first wireless communication between the mobile terminal and the image recording apparatus is established;
determining a particular set of reference information in accordance with at least one of the signals stored;
determining a particular image recording condition in association with the particular set of reference information;
transmitting, to the image recording apparatus over one of the first wireless communication and the second wireless communication, a command for causing the image recording apparatus in accordance with the particular image recording condition;
transmitting, to the image recording apparatus over the second wireless communication, image data based on which the image recording apparatus is to record an image among the image data stored in the storage.

11. A non-transitory storage medium storing a plurality of instructions executable by a computer of a mobile terminal, the mobile terminal comprising: a storage configured to store image data and a table comprising a plurality sets of reference information, the plurality sets of reference information each being in association with a corresponding one of a plurality of image recording conditions; a mobile-terminal first communication device configured to perform data communication with the image recording apparatus over first wireless communication which is established when a distance between the mobile terminal and the image recording apparatus is less than a communicable distance; a mobile-terminal second communication device configured to perform data communication with the image recording apparatus over second wireless communication which is established based on communication setting information about the mobile terminal and the image recording apparatus; and a position detector configured to output a signal representative of a position of the mobile terminal,
the plurality of instructions, when executed by the computer, causing the mobile terminal to perform:
at least one of (i) transmitting the communication setting information about the mobile terminal over the first wireless communication and (ii) receiving the communication setting information about the image recording apparatus over the first wireless communication;
successively storing signals output by the position detector, while the first wireless communication between the mobile terminal and the image recording apparatus is established;
determining a particular set of reference information in accordance with at least one of the signals stored;
determining a particular image recording condition in association with the particular set of reference information;
transmitting, to the image recording apparatus over one of the first wireless communication and the second wireless communication, a command for causing the image recording apparatus in accordance with the particular image recording condition;
transmitting, to the image recording apparatus over the second wireless communication, image data based on which the image recording apparatus is to record an image among the image data stored in the storage.

12. The non-transitory storage medium according to claim 11, wherein when executed by the computer, the plurality of instructions cause the mobile terminal not to transmit the command in accordance with the particular image recording condition to the image recording apparatus when a disconnected period has passed a first period, and wherein the disconnected period is a time period in which first wireless communication between the mobile terminal and the receiver device is not established and which is continued from a start of disconnection of the first wireless communication established between the mobile terminal and the image recording apparatus.

13. The non-transitory storage medium according to claim 12, wherein when executed by the computer, the plurality of instructions cause the mobile terminal to transmit the image data to the image recording apparatus over the second wireless communication when the disconnected period has passed the first period.

14. The non-transitory storage medium according to claim 11,
wherein the particular image recording condition is determined at a time point when a disconnected period has passed a first period, and wherein the disconnected period is a time period in which the first wireless communication is not established and which is continued from a start of disconnection of the first wireless communication, and
wherein when executed by the computer, the plurality of instructions cause the mobile terminal to execute the storing until the disconnected period has passed a second period which is equal to or shorter than the first period.

15. An image recording apparatus comprising:
an image-recording-apparatus first communication device configured to perform data communication with a mobile terminal over first wireless communication which is established when a distance between the mobile terminal and the image recording apparatus is less than a communicable distance;

an image-recording-apparatus second communication device configured to perform data communication with the mobile terminal over second wireless communication which is established based on communication setting information about the mobile terminal and the image recording apparatus;

an image recording mechanism configured to record an image on a recording medium based on image data; and an image-recording-apparatus controller configured to control the image-recording-apparatus first communication device, the image-recording-apparatus second communication device, and the image recording mechanism, the image-recording-apparatus controller being configured to perform:

at least one of (i) receiving the communication setting information about the mobile terminal which is transmitted from the mobile terminal over the first wireless communication and (ii) transmitting the communication setting information about the image recording apparatus which is received by the mobile terminal over the first wireless communication;

continuing to receive at least one command for an image recording condition from the mobile terminal over the first wireless communication until the first wireless communication is disconnected; and after a predetermined length of time has passed from the disconnection of the first wireless communication, controlling the image recording mechanism to use the image recording condition indicated by the at least one command received from the mobile terminal, to record an image based on the image data transmitted from the mobile terminal over the second wireless communication.

* * * * *